United States Patent
Kim (10) Patent No.: US 8,744,235 B2
(45) Date of Patent: Jun. 3, 2014

(54) METHOD AND APPARATUS FOR PROCESSING ADDITIONAL DATA IN BROADCAST SIGNAL, METHOD AND APPARATUS FOR RECORDING BROADCAST SIGNAL, AND METHOD AND APPARATUS FOR REPRODUCING RECORDED BROADCASTING SIGNAL

(75) Inventor: Young-Jin Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 827 days.

(21) Appl. No.: 12/348,961

(22) Filed: Jan. 6, 2009

(65) Prior Publication Data

US 2009/0185790 A1 Jul. 23, 2009

(30) Foreign Application Priority Data

Jan. 21, 2008 (KR) ........................ 10-2008-0006344

(51) Int. Cl.
- *H04N 9/80* (2006.01)
- *H04N 5/92* (2006.01)
- *G11B 27/00* (2006.01)
- *H04N 5/93* (2006.01)
- *H04N 5/917* (2006.01)
- *H04N 5/783* (2006.01)

(52) U.S. Cl.
USPC ........... 386/239; 386/244; 386/278; 386/330; 386/337; 386/343

(58) Field of Classification Search
USPC .................. 386/239–248, 278–290, 326–342
See application file for complete search history.

(56) References Cited

U.S. PATENT DOCUMENTS

| | | | | |
|---|---|---|---|---|
| 6,219,381 | B1* | 4/2001 | Sawada et al. | 375/240.14 |
| 6,647,202 | B1* | 11/2003 | Yamaguchi et al. | 386/337 |
| 6,788,710 | B1* | 9/2004 | Knutson et al. | 370/535 |
| 2002/0102093 | A1* | 8/2002 | Hisatomi et al. | 386/69 |
| 2002/0154902 | A1* | 10/2002 | Okamoto et al. | 386/112 |
| 2007/0189315 | A1* | 8/2007 | Aoyanagi | 370/412 |
| 2007/0230894 | A1* | 10/2007 | Kimura et al. | 386/35 |

FOREIGN PATENT DOCUMENTS

| | | |
|---|---|---|
| KR | 96030199 A | 8/1996 |
| KR | 96704432 A | 8/1996 |
| KR | 20010033583 A | 6/2001 |
| WO | 9506391 A1 | 3/1995 |
| WO | 9746007 A1 | 12/1997 |
| WO | 9934598 A1 | 7/1999 |

* cited by examiner

*Primary Examiner* — Hung Dang
(74) *Attorney, Agent, or Firm* — Sughrue Mion, PLLC (57) ABSTRACT

A method and apparatus for processing additional data in a broadcast signal, a method and apparatus for recording a broadcast signal, and a method and apparatus for reproducing the recorded broadcast signal, which allow the normal display of additional data such as closed caption data on a screen during high-speed playback. The method includes extracting additional data from a video frame in an externally received broadcast signal, storing the extracted additional data in a transport stream generated from the broadcast signal, storing the transport stream containing the additional data, extracting the additional data from the stored transport stream according to a playback command, and separating a video signal and an audio signal from the transport stream and outputting the separate video signal and audio signal such that the extracted additional data is superimposed on the output video signal.

7 Claims, 5 Drawing Sheets

METHOD AND APPARATUS FOR PROCESSING ADDITIONAL DATA IN BROADCAST SIGNAL, METHOD AND APPARATUS FOR RECORDING BROADCAST SIGNAL, AND METHOD AND APPARATUS FOR REPRODUCING RECORDED BROADCASTING SIGNAL

CROSS-REFERENCE TO RELATED APPLICATION

This application claims priority from Korean Patent Application No. 10-2008-0006344 filed on Jan. 21, 2008 in the Korean Intellectual Property Office, the disclosure of which is incorporated herein by reference in its entirety.

BACKGROUND OF THE INVENTION

1. Field of the Invention

Methods and apparatuses consistent with the present invention relate to processing a broadcast signal, and more particularly, to processing additional data in a broadcast signal, to recording a broadcast signal, and to reproducing the recorded broadcast signal, which allows the normal display of additional data such as closed caption data on a screen during high-speed playback.

2. Description of the Related Art

Conventionally, video cassette recorders (VCRs) using tape-based media have been the mainstream technology for recording an analog broadcast signal. In recent years, with the emergence of an era of digital broadcasting, various types of recording media have been developed that have several advantages over analog broadcasting.

Some examples of recording media are digital VCRs, hard disk drives (HDDs), and optical disk recording devices. Rapid technical developments have made HDDs a popular storage medium. HDDs are now comparable to tape-based media in terms of storage capacity, and easily trump other storage mediums in speed and reliability.

Due to the full-scale launch of digital broadcasting and widespread use of digital television (DTV) receivers, DTV receivers with various supplementary functions are being actively developed to meet various user needs.

One of the most promising supplementary functions is a Personal Video Recorder (PVR) function that enables various playbacks from a large capacity HDD. That is, unlike traditional tape-based analog VCRs, PVRs allow storage of audio and video information in a digital format to support lossless quality of information in the event of unlimited recordings or playbacks.

Figure 1:
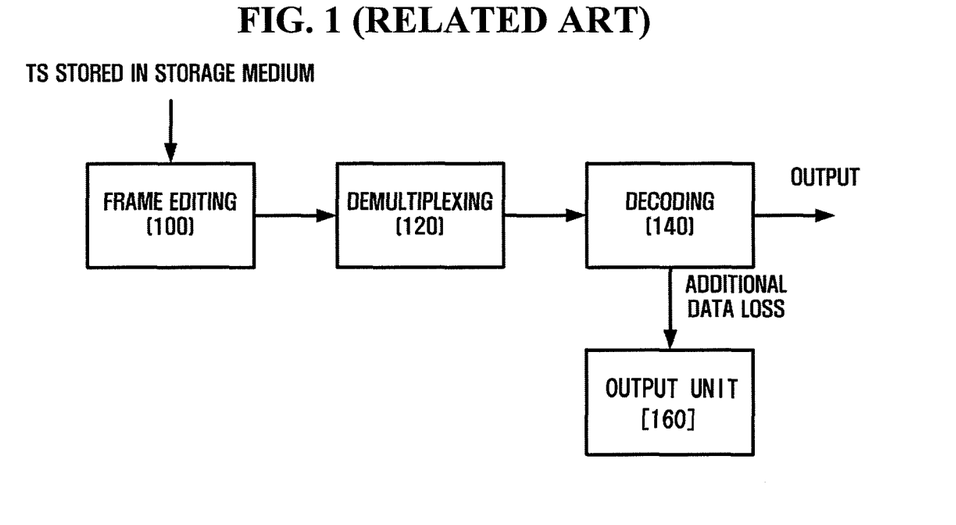
FIG. 1 illustrates a related art method of playing back a broadcast signal that suffers the drawback that additional data is not normally output during high-speed playback.

In order to achieve high-speed playback of a broadcast signal recorded in a transport stream (TS) format at "X" speed not supported on hardware on a conventional TV having a PVR function, frame editing 100 is performed on the TS as shown in FIG. 1. In this case, several frames may be deleted from the broadcast signal for high-speed playback, together with additional data such as closed caption data therein.

The broadcast signal that has undergone the frame editing 100 is then subjected to demultiplexing 120 and decoding 140 and is output to an output unit 160 for high-speed playback. The output unit 160 can be an application. However, additional data is lost and not normally output during high-speed playback.

SUMMARY OF THE INVENTION

The present invention provides a method and apparatus for processing additional data in a broadcast signal, a method and apparatus for recording a broadcast signal, and a method and apparatus for reproducing the recorded broadcast signal, which enable the normal output of additional data such as closed caption data on a screen during high-speed playback.

The above and other aspects of the present invention will be described in or be apparent from the following description of the exemplary embodiments.

According to an aspect of the present invention, there is provided a method of processing additional data in a broadcast signal, the method including: extracting additional data from a video frame in an externally received broadcast signal; storing the extracted additional data in a transport stream generated from the broadcast signal; storing the transport stream containing the additional data; extracting the additional data from the stored transport stream according to a playback command; separating a video signal and an audio signal from the transport stream; and outputting the separate video signal and audio signal such that the extracted additional data is superimposed on the output video signal.

According to another aspect of the present invention, there is provided an apparatus for processing additional data in a broadcast signal, the apparatus including: an additional data recording processor which extracts additional data from a video frame in an externally received broadcast signal and which stores the extracted additional data in a transport stream generated from the broadcast signal; a recording controller which stores the transport stream containing the additional data; an additional data playback processor which extracts the additional data from the stored transport stream according to a playback command; and a playback controller which causes a video signal and an audio signal to be separated from the transport stream and which outputs the separated video and audio signal such that the extracted additional data is superimposed on the output video signal.

According to still another aspect of the present invention, there is provided a method for recording a broadcast signal, the method including: extracting additional data from a video frame in an externally received broadcast signal; storing the extracted additional data in a transport stream generated from the broadcast signal; and storing the transport stream containing the additional data.

According to a further aspect of the present invention, there is provided an apparatus for recording a broadcast signal, the apparatus including: an additional data recording processor which extracts additional data from a video frame in an externally received broadcast signal and which stores the extracted additional data in a transport stream generated from the broadcast signal; and a recording controller which stores the transport stream containing the additional data.

According to yet another aspect of the present invention, there is provided an apparatus for playing back a recorded broadcast signal, the apparatus including an additional data playback processor which extracts additional data from stored transport stream according to a playback command; a playback controller which causes a video signal and an audio signal to be separated from the transport stream; and which outputs the separated video and audio signal such that the extracted additional data is superimposed on the output video signal.

According to a further aspect of the present invention, there is provided a method for playing back a recorded broadcast signal, the method including: extracting additional data from stored transport stream according to a playback command; separating a video signal and an audio signal from the transport stream; and outputting the separate video signal and audio signal such that the extracted additional data is superimposed on the output video signal.

According to another aspect of the present invention, there is provided a computer-readable medium storing instructions that, when executed by a computer, cause the computer to perform a method of processing additional data in a broadcast signal, the method including: extracting additional data from a video frame in an externally received broadcast signal; storing the extracted additional data in a transport stream generated from the broadcast signal; storing the transport stream containing the additional data; extracting the additional data from the stored transport stream according to a playback command; separating a video signal and an audio signal from the transport stream; and outputting the separate video signal and audio signal such that the extracted additional data is superimposed on the output video signal and outputting the separate video signal, audio signal, and the extracted additional data.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY
EMBODIMENTS OF THE INVENTION

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of methods according to exemplary embodiments of the invention.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to create means for implementing the functions specified in the flowchart block or blocks. These computer program instructions may also be stored in a computer usable or computer-readable memory that can direct a computer or other programmable data processing apparatus to function in a particular manner, such that the instructions implement the function specified in the flowchart block or blocks.

The computer program instructions may also be loaded onto a computer or other programmable data processing apparatus to cause a series of operational steps to be performed on the computer or other programmable apparatus to produce a computer implemented process for implementing the functions specified in the flowchart block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

Figure 2:
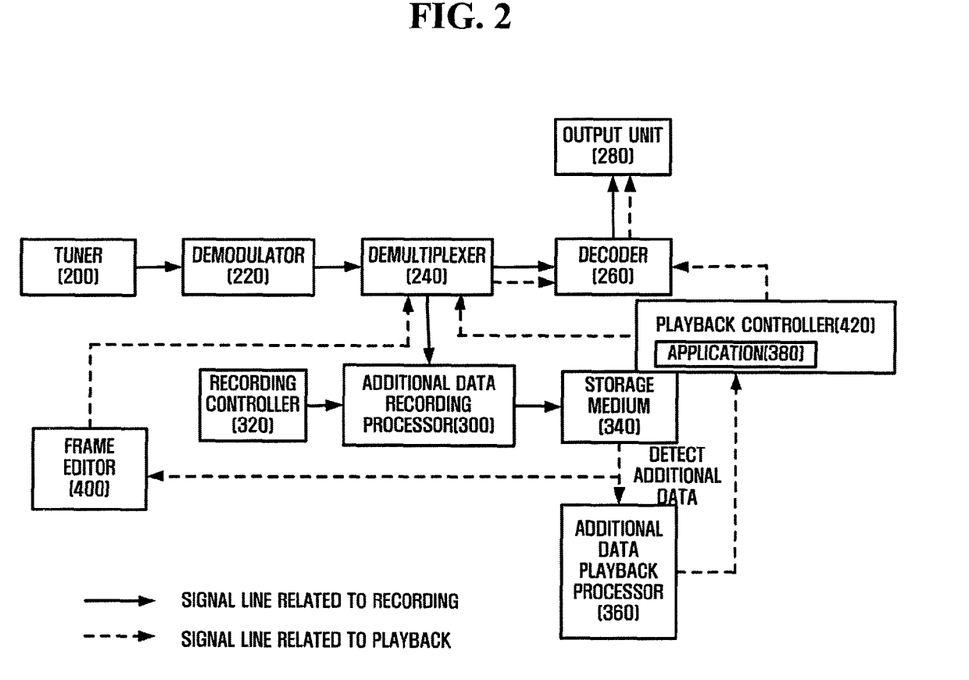
FIG. 2 illustrates the configuration of an apparatus for processing additional data in a broadcast signal according to an exemplary embodiment of the present invention.

FIG. 2 illustrates the configuration of an apparatus for processing additional data in a broadcast signal according to an exemplary embodiment of the present invention.

The apparatus for processing additional data in a broadcast signal illustrated in FIG. 2 may be realized by integrating a device for recording a broadcast signal with a device for reproducing a recorded broadcast signal. The apparatus can be applied to various systems including, but not limited to, TVs and set-top boxes (STBs) with Personal Video Recorder (PVR) functions. A PVR is a device that can store broadcast programs or related content such as broadcast data, characters, and photos in a digital format and play them back at any time without degrading image quality. A PVR typically uses a hard disk drive (HDD) as a medium for storing the programs or content.

The apparatus, according to the present exemplary embodiment, includes a tuner 200, a demodulator 220, a demultiplexer 240, a decoder 260, an output unit 280, an additional data recording processor 300, and a recording controller 320. The apparatus further includes an additional data playback processor 360, a frame editor 400, and a playback controller 420.

The broadcast signal may be an analog or digital broadcast signal being received through the tuner 200. The broadcast signal also represents a signal corresponding to at least one of a plurality of broadcast channels.

The broadcast signal contains an audio signal, a video signal, and additional data. The audio signal represents a program for playing back audio or audio information or data for a broadcast channel. The video signal represents a program for playing back video or video information or data for a broadcast channel. The additional data represents information contained or not contained in a broadcast channel or program. For example, additional data in an analog broadcast signal may include data carried during the vertical blanking interval (VBI), as is known in the art, or other information. Additional data in a digital broadcast signal may include data carried in program information data, or other information.

In the present embodiment, additional data is closed caption data. However, the additional data may be any other data that is not normally output on a video signal during a high-speed playback.

The tuner 200 selects a high frequency signal of a certain channel among signals received from broadcasting stations, converts the selected high frequency signal into an Intermediate Frequency (IF) signal, and outputs the IF signal to the demodulator 220. The demodulator 220 demodulates the IF signal of the specific channel into a digital Transport Stream (TS) which is then stored in a buffer (not shown) for output to the output unit 280

The TS stored in the buffer is then provided to the demultiplexer 240 and the decoder 260. The demultiplexer 240 separates an audio signal and a video signal from the multiplexed TS. The decoder 260 decodes the audio signal and the video signal and outputs the decoded signals to the output unit 280. When a "record" command is input, the additional data recording processor 300 extracts closed caption data from the video signal separated by the demultiplexer 240.

According to the National Television System Committee (NTSC) broadcast standard, closed caption data is carried in line 21 of a non-active period (i.e. VBI) of a broadcast signal (see FIG. 3) during transmission.

Figure 3:
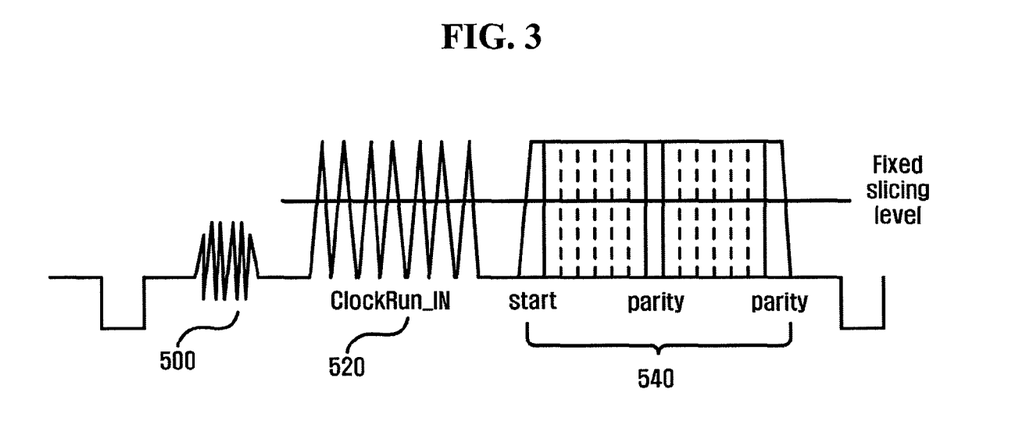
FIG. 3 is a waveform diagram showing the characteristics of a signal carried in line 21 of a vertical blanking interval (VBI) on the National Television Standard Committee (NTSC) broadcast standard.

Referring to FIG. 3, line 21 includes a color burst signal 500, a 7 cycle sine wave ClockRun-IN 520, and a closed caption data signal 540. The closed caption data signal 540 consists of 1 start bit, followed by two separate bytes of data representing characters. Each 8-bit byte contains 7-bit clean data and 1 parity bit.

The additional data recording processor 300 compares a closed caption data signal included in the VBI of a video signal with a predetermined fixed slicing level and detects closed caption data. More specifically, the additional data recording processor 300 slices a closed caption data signal according to the period of the sine wave 520 to convert the closed caption data signal into a digital signal. Then, if the closed caption data signal is converted into a digital signal, the additional data recording processor 300 compares the digital signal with the fixed slicing level to output "0" or "1".

On the other hand, according to the Advanced Television Systems Committee (ATSC) broadcast standard, closed caption data is carried in program information data in a broadcast signal during transmission. Thus, the additional data recording processor 300 finds closed caption data in the program information data for detection.

The additional data recording processor 300 stores the extracted closed caption data in TS. To achieve this purpose, the additional data recording processor 300 finds a null packet in the TS and stores the closed caption data in the found null packet.

A "null" packet is a packet with no useful data, which is transmitted to keep the constant transfer rate. The null packet may be inserted regularly or irregularly into the TS. Since such a null packet has a packet identifier (PID) value of 0x1fff in a header, the additional data recording processor 300 finds a PID with a value of 0x1fff and stores the closed caption data in a packet having the same PID value.

The null packet may contain the content and length of closed caption data and location information indicating a location of a next null packet containing closed caption data. The location information is used to save the time required to read a packet having no closed caption data upon extracting the next closed caption data.

The recording controller 320 causes the TS having the closed caption data to be stored on a storage medium 340 such as an HDD, thereby completing the recording of the broadcast signal.

When a "playback" command is input, the additional data playback processor 360 extracts closed caption data from TS stored on the storage medium 340 and transmits the closed caption data to an application 380. The application 380 outputs the closed caption data to be superimposed on a video signal being output to the output unit 280. In the present embodiment, the application 380 may be integrated into the playback controller 420.

Similar to the additional data recording processor 300, the additional data playback processor 360 finds a TS packet (i.e., null packet) having a PID value of 0x1fff, extracts closed caption data from the found null packet, and sends the closed caption data to the application 380.

The additional data playback processor 360 extracts closed caption data from a next null packet containing closed caption data using information contained in the first null packet found in TS packets, i.e., location information about the next null packet. The additional data playback processor 360 repeats the extracting operations to transmit the closed caption data included in the null packets to the application 380.

Upon playing back at speed not supported by the decoder 260, the frame editor 400 edits frames from TS from which closed caption data have been extracted so as to facilitate high-speed playback. In this case, the frame editor 400 may delete at least one frame from the TS for high-speed playback.

The playback controller 420 controls the demultiplexer 240 and the decoder 260 so that the TS subjected to the frame editing is separated into an audio signal and a video signal. The playback controller 420 also causes the closed caption data extracted by the additional data playback processor 360 to be superimposed on the video signal for output.

Figure 4:
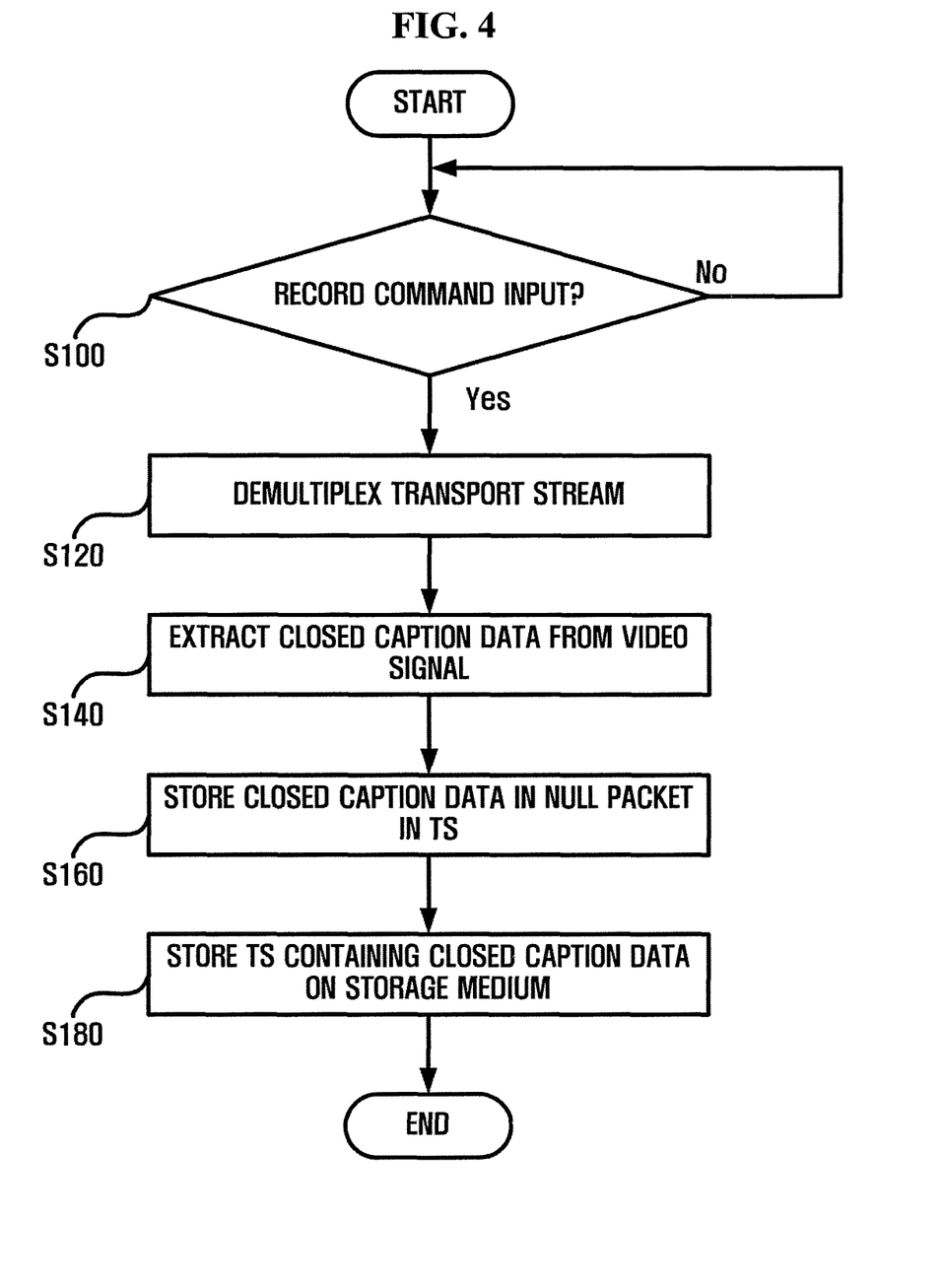
FIG. 4 is a flowchart illustrating a method of recording a broadcast signal according to an exemplary embodiment of the present invention.

FIG. 4 is a flowchart illustrating a method of recording a broadcast signal according to an exemplary embodiment of the present invention.

Referring to FIGS. 2 and 4, when a record command is input (S100), the demultiplexer 240 separates TS extracted from a broadcast signal through the tuner 200 and the demodulator 220 into an audio signal and a video signal (S120).

The additional data recording processor 300 extracts closed caption data from the separated video signal (S140). Since the closed caption data is extracted according to the method as described above, a detailed explanation thereof will not be given.

The additional data recording processor 300 then stores the extracted closed caption data in the TS (S160). More specifically, the additional data recording processor 300 finds a null packet in the TS and stores the closed caption data in the found null packet. In this case, the null packet may contain the content and length of closed caption data and location information about a next null packet containing closed caption data.

Thereafter, the TS carrying the closed caption data is stored on the storage medium 340 such as an HDD, thereby completing the recording of the broadcast signal (S180).

Figure 5:
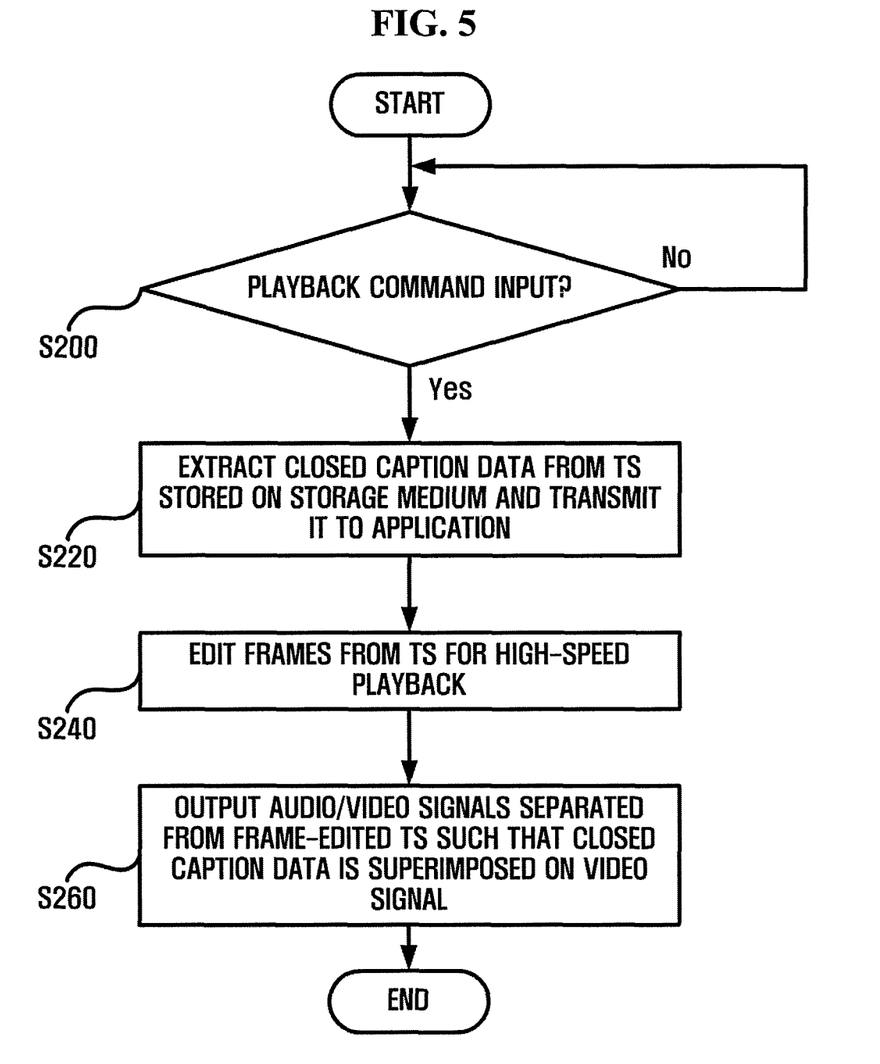
FIG. 5 is a flowchart illustrating a method of reproducing a recorded broadcast signal according to an exemplary embodiment of the present invention.

FIG. 5 is a flowchart illustrating a method of playing back a recorded broadcast signal at high speed that is not supported by the decoder 260 in FIG. 2 according to an exemplary embodiment of the present invention.

Referring to FIGS. 2 and 5, when a playback command is input (S200), the additional data playback processor 360 finds a null packet in TS stored on the storage medium, extracts closed caption data from the found null packet, and sends the closed caption data to the application 380 (S220).

More specifically, the additional data playback processor 360 extracts closed caption data from a next null packet containing closed caption data using information contained in the first null packet found in TS packets, i.e., location information about the next null packet. The additional data playback processor 360 repeats the extracting operations to transmit the closed caption data included in the null packets to the application 380.

Thereafter, the frame editor 400 edits frames from TS from which closed caption data have been extracted so as to facilitate high-speed playback (S240). In this case, the frame editor 400 may delete at least one frame from the TS for high-speed playback.

The playback controller 420 then controls the demultiplexer 240 and the decoder 260 so that the TS subjected to the frame editing is separated into an audio signal and a video signal. The playback controller 420 also causes the closed caption data extracted by the additional data playback processor 360 to be superimposed on the video signal for output (S260). Thus, the method allows normal output of the closed caption data during high-speed playback.

As described above, a method and apparatus for processing additional data in a broadcast signal, a method and apparatus for recording a broadcast signal, and a method and apparatus for reproducing the recorded broadcast signal according to exemplary embodiments of the present invention allow the normal output of additional data such as closed caption data on a screen during high-speed playback.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the exemplary embodiments be considered in all respects as illustrative and not restrictive, reference being made to the appended claims rather than the foregoing description to indicate the scope of the invention.

What is claimed is:

1. A method of processing additional data in a broadcast signal, the method comprising:
   extracting additional data from a video frame in a broadcast signal;
   storing the extracted additional data in a transport stream generated from the broadcast signal;
   storing the transport stream containing the additional data;
   extracting the additional data from the stored transport stream according to a playback command;
   separating a video signal and an audio signal from the transport stream;
   editing frames from the transport stream to facilitate high speed playback by deleting at least one frame from the transport stream; and
   outputting the video signal and the audio signal such that the extracted additional data is superimposed on the video signal,
   wherein the storing of the extracted additional data in the transport stream comprises replacing a null packet in the transport stream with the extracted additional data,
   wherein the replacing of the null packet in the transport stream with the additional data comprises storing a content and length of the additional data and location information about another null packet containing a next additional data in the null packet, and
   wherein the next additional data comprises data continued from the additional data.

2. The method of claim 1, wherein the additional data comprises closed caption data.

3. An apparatus for processing additional data in a broadcast signal, the apparatus comprising:
   an additional data recording processor which extracts additional data from a video frame in a broadcast signal and stores the extracted additional data in a transport stream generated from the broadcast signal;
   a recording controller which stores the transport stream containing the additional data;
   an additional data playback processor which extracts the additional data from the stored transport stream according to a playback command;
   an editor which edits frames from the transport stream to facilitate high speed playback by deleting at least one frame from the transport stream; and
   a playback controller which causes a video signal and an audio signal to be separated from the transport stream and output such that the extracted additional data is superimposed on the video signal,
   wherein the additional data recording processor stores the extracted additional data in the transport stream by replacing a null packet in the transport stream with the extracted additional data,
   wherein the additional data recording processor stores a content and length of the additional data and location information about another null packet containing a next additional data in the null packet, and
   wherein the next additional data comprises data continued from the additional data.

4. The apparatus of claim 3, wherein the additional data comprises closed caption data.

5. An apparatus for playing back a recorded broadcast signal, the apparatus comprising:
   an additional data playback processor which extracts additional data from a stored transport stream according to a playback command;
   an editor which edits frames from the transport stream to facilitate high speed playback by deleting at least one frame from the transport stream; and
   a playback controller which causes a video signal and an audio signal to be separated from the transport stream and output such that the extracted additional data is superimposed on the video signal,
   wherein the additional data is stored in a null packet in the transport stream,
   wherein a content and length of the additional data and location information about another null packet containing a next additional data are stored in the null packet, and
   wherein the next additional data comprises data continued from the additional data.

6. The apparatus of claim 5, wherein the additional data comprises closed caption data.

7. A non-transitory computer-readable medium storing instructions that, when executed by a computer, cause the computer to perform a method of processing additional data in a broadcast signal, the method comprising:
   extracting additional data from a video frame in a broadcast signal;
   storing the extracted additional data in a transport stream generated from the broadcast signal;
   storing the transport stream containing the additional data;
   extracting the additional data from the stored transport stream according to a playback command;
   separating a video signal and an audio signal from the transport stream;
   editing frames from the transport stream to facilitate high speed playback by deleting at least one frame from the transport stream; and
   outputting the video signal and the audio signal such that the extracted additional data is superimposed on the video signal, wherein the storing of the extracted additional data in the transport stream comprises replacing a null packet in the transport stream with the extracted additional data,
wherein the replacing of the null packet in the transport stream with the additional data comprises storing a content and length of the additional data and location information about another null packet containing a next additional data in the null packet, and
wherein the next additional data comprises data continued from the additional data.

* * * * *